United States Patent
Jung et al.

(10) Patent No.: US 7,925,022 B2
(45) Date of Patent: *Apr. 12, 2011

(54) DEVICE PAIRING VIA DEVICE TO DEVICE CONTACT

(75) Inventors: Edward K. Y. Jung, Bellevue, WA (US); Mark A. Malamud, Seattle, WA (US); Alexander J. Cohen, Mill Valley, CA (US); Robert W. Lord, Seattle, WA (US); Royce A. Levien, Lexington, MA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1132 days.

This patent is subject to a terminal disclaimer.

(21) Appl. No.: 11/136,099

(22) Filed: May 23, 2005

(65) Prior Publication Data

US 2007/0003061 A1    Jan. 4, 2007

(51) Int. Cl.
*H04K 1/10* (2006.01)
*H04B 5/00* (2006.01)
*G06F 17/30* (2006.01)

(52) U.S. Cl. ....... 380/270; 380/247; 380/258; 455/41.1; 455/41.2; 726/4; 726/27

(58) Field of Classification Search ............ None
See application file for complete search history.

(56) References Cited

U.S. PATENT DOCUMENTS

| | | | |
|---|---|---|---|
| 5,805,672 A | 9/1998 | Barkat | |
| 6,377,825 B1 | 4/2002 | Kennedy | |
| 2002/0137505 A1 | 9/2002 | Eiche | |
| 2003/0162556 A1* | 8/2003 | Libes | 455/507 |
| 2004/0248513 A1* | 12/2004 | Glass et al. | 455/41.1 |
| 2005/0044372 A1* | 2/2005 | Aull et al. | 713/176 |
| 2005/0266798 A1 | 12/2005 | Moloney et al. | |
| 2008/0166966 A1* | 7/2008 | Hamasaki et al. | 455/41.2 |

OTHER PUBLICATIONS

"Miscellaneous Voice Pairing Material," miscellaneous publications.
"Miscellaneous Sources for Near Field Communications," miscellaneous publications.
ECMA International, "Near Field Communication," Ecma/TC32-TG19/2004/1.
"Cellport Announces First Universal, Hands-Free Cell Phone System for Cars"; Intelligent Transportation Society of America; Bearing a date of Jul. 16, 2001; pp. 1-2; printed on Feb. 24, 2006; http://www.itsa.org/itsnews.nsf/key/5FAA?OpenDocument; Intelligent Transportation Society of America.
"eCash on the Move at Volkswagen"; iButton Applications/Dallas Semiconductor MAXIM, Bearing a date of 2006; pp. 1-2; printed on Feb. 27, 2006; http://www.maxim-ic.com/products/ibutton/applications/index.cfm?Action=DD&id=21; Maxim Integrated Products.
"Ecma welcomes ISO/IEC adoption of NFC Standard for short range wireless communication"; ecma Internatonal; Bearing a date of Dec. 8, 2003; printed Feb. 24, 2006; pp. 1-3; http://www.ecma-international.org/news/Ecma-340-NFCIP-1.htm.

(Continued)

*Primary Examiner* — Nasser Moazzami
*Assistant Examiner* — Fatoumata Traore

(57) ABSTRACT

A system may include and/or involve a first device, a second device, and logic to effect pairing of the first and second devices upon detection of physical contact between the devices.

14 Claims, 3 Drawing Sheets

OTHER PUBLICATIONS

"Industry giants tout touch computing"; Computing; Bearing the dates of 1995-2006; pp. 1-2; printed Feb. 24, 2006; http://www.computing.co.uk/vnunet/news2124597/industry-giants; vnu business publications.

Kiser, Ken; "Newall Electronics Introduces Wearable DRO Technology"; Industrial Product News Online; pp. 1-2; printed Feb. 24, 2006; http://www.ipnews.com/archives/dro/jan02/newall%5Felect.htm.

Cameron, Casey et al.; "Knuckletop Computing: The Java Ring"; pp. 1-4; http://java.sun.com/features/1998/03/rings.html.

Lewis, John; "Put on your human-machine interface"; Design News; Bearing dates Aug. 20, 2001 and 1997-2006; pp. 1-4; printed Feb. 24, 2006; http://designnews.com/article/CA150040.html; Reed Business Information.

"Mass Transit in Istanbul, Turkey" and "Parking in Argentina"; iButton Applications/Dallas Semiconductor MAXIM; Bearing a date of 2006; pp. 1-3; printed Feb. 27, 2006; http://www.maxim-ic.com/products/ibutton/applications/index.cfm?Action=DD&id=8; Maxim Integrated Products.

"Near Field Communication"; What You Need to Know About; Bearing a date of 2006; pp. 1-3; printed on Mar. 3, 2006; http://experts.about.com/e/n/ne/Near_Field_Communication.htm; About, Inc.

"Near Field Communication"; Wikipedia; Bearing a date of Feb. 17, 2006; pp. 1-2; printed on Feb. 24, 2006; http://en.wikipedia.org/wiki/Near_Field_Communication.

"Secure Website Logon and Transactions"; iButton Applications; Bearing a date of 2004; pp. 1-2; printed on Mar. 3, 2006; http://72.14.207.104/search?q=cache:4JM396tN_ToJ:db.maxim-ic.com/ibutton/applications/index.cfm; Maxim/Dallas Semiconductor Corp.

* cited by examiner

DEVICE PAIRING VIA DEVICE TO DEVICE CONTACT

TECHNICAL FIELD

The present disclosure relates to the pairing of two devices for trusted cooperation.

BACKGROUND

Pairing involves establishing a secure and/or trusted wireless communication channel between devices. Pairing is becoming more common in a world increasingly populated by cooperating devices. However, the mechanisms for pairing devices remain relatively primitive and do not take advantage of the rich variety of ways in which people and devices may interact with and among one another.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A device may include and/or involve at least one contact sensor, and logic to effect pairing with another device upon activation of the contact sensor.

The device may include and/or involve logic to detect increasing proximity with the other device and to interpret activation of the contact sensor, in conjunction with recently detected increasing proximity with the other device, as an indication that pairing with the other device should be attempted.

The device may include and/or involve logic to enable the device to wirelessly exchange with the other device information needed for pairing, upon approaching or becoming proximate with the other device, but prior to activation of the contact sensor, and logic to interpret activation of the contact sensor as an indication that the information should be applied to complete the pairing process.

The device may include and/or involve logic to enable the device to exchange with the other device information needed for pairing via the physical contact point.

The device may include and/or involve logic to interpret activation of the contact sensor as an indication to initiate exchange with the other device of at least one of authentication, authorization, or compatibility information needed for pairing.

The device may include and/or involve logic to discontinue pairing of the device and the other device. The logic to discontinue pairing of the device and the other device may include and/or involve logic to discontinue pairing when the device and other device are no longer proximate with one another, and/or logic to discontinue pairing if an amount of authorized pairing time lapses, and/or logic to discontinue pairing due to contact being broken between the device and the other device, and/or logic to discontinue pairing due to a user selection to discontinue pairing, and/or to discontinue pairing upon the completion of one or more tasks.

The device may include and/or involve logic to retain information about the pairing of the device and the other device.

The device may include and/or involve logic to apply the retained information to resume pairing of the device and the other device, after pairing of the device and the other device is discontinued and-or interrupted. The logic to apply the retained information to resume pairing of the device and the other device, after pairing of the device and the other device is discontinued and-or interrupted may include and/or involve logic to apply the retained information to resume pairing of the device and the other device once the device and the other device are once again in proximity, and/or logic to apply the retained information to resume pairing of the device and the other device one the device is once again in contact with the device and-or the other device, and/or logic to apply the retained information to resume pairing of the device and the other device, once the device is once again in communication with the other device.

The device may include and/or involve logic to enable the device to wirelessly exchange with the other device information needed for pairing only during activation of the contact sensor.

The device may include and/or involve logic to authenticate and/or authorize pairing with the other device.

The device may include and/or involve logic to establish a secure channel for communication of pairing information.

The device may include and/or involve logic to ascertain a manner in which contact between the device and the other device is accomplished. The logic to ascertain a manner in which contact between the device and the other device is accomplished may include and/or involve logic to ascertain relative motion between the device and the other device. The logic to ascertain relative motion between the device and the other device may include and/or involve logic to ascertain at least one of rotation, angle of approach, or relative lateral motion between the device and the other device.

The device may include and/or involve logic to ascertain relative motion between the device and the other device at the point of contact. The logic to ascertain relative motion between the device and the other device may include and/or involve logic to ascertain at least one of rotation, angle of approach, or relative lateral motion between the device and the other device, and/or logic to ascertain at least one of rotation at the point of contact, angle of contact, or relative lateral motion at the point of contact.

The device may include and/or involve logic to detect a duration of contact and to interpret the duration of contact as an indication of how and/or whether pairing of the device and the other device should proceed.

The device may include and/or involve logic to detect multiple instances of contact and to interpret the multiple instances of contact as an indication of how and/or whether pairing of the device and the other device should proceed.

The device may include and/or involve logic to detect an intensity of contact and to interpret the intensity of contact as an indication of how and/or whether pairing of the device and the other device should proceed. The logic to detect an intensity of contact and to interpret the intensity of contact as an indication of how and/or whether pairing of the device and the other device should proceed may include and/or involve logic to detect at least one of an average contact force, a peak contact force, or a force gradient.

The device may include and/or involve logic to detect temperature at the contact point or points, and/or conductivity at the contact point or points, as an indication of how and/or whether pairing of the device and the other device should proceed.

The device may include and/or involve logic to communicate wirelessly with at least one device different than the other device to obtain information needed to effect pairing with the other device. The at least one device different than the other device may include and/or involve at least one of a proximate desktop, a laptop, or a handheld computing device.

The device may include and/or involve logic to await user input as a result of activation of the contact sensor. The logic to await user input as a result of activation of the contact sensor may include and/or involve logic to await authentication information for the user, and/or logic to await at least one of input from a keypad, a voice input, or a biometric input.

The device may include and/or involve logic to authorize an extent of pairing of the device and the other device. The logic to authorize an extent of pairing of the device and the other device may include and/or involve logic to authorize paired access to a greater number and/or different functions of one or both devices than would be available if the devices were paired without physical contact, and/or logic to authorize paired access the extent of which varies according to the manner and/or point of physical contact between the devices, and/or logic to authorize that a person using one or both devices is authorized to do so, and/or to what extent.

The device may include and/or involve logic to provide one or more audible and/or visual and/or tactile indications on the progress and/or results of pairing of the device and the other device. The logic to provide one or more audible and/or visual and/or tactile indications on the progress and/or results of pairing of the device and other device may include and/or involve at least one pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available, or an indication that pairing is in process. The logic to provide an indication that a user should provide input to the pairing process may include and/or involve logic to provide an indication that the user should provide at least one of a password, a spoken input, a biometric input, or information from a card and/or memory device.

A method may include and/or involve detecting physical contact between devices, and effecting pairing between the devices as a result of detecting the physical contact.

The method may include and/or involve detecting proximity between the devices and interpreting physical contact, in conjunction with recently detected increasing proximity between the devices, as an indication that pairing of the devices should be attempted.

The method may include and/or involve wirelessly exchanging information needed for pairing between the devices, upon the devices becoming proximate with one another, but prior to contact between the devices, and interpreting contact between the devices as an indication to complete pairing of the devices.

The method may include and/or involve exchanging information needed for pairing the devices via one or more physical contact points.

The method may include and/or involve contact between the devices initiating exchange between the devices of at least one of authentication, authorization, or compatibility information needed for pairing.

The method may include and/or involve interrupting the pairing process if the devices lose contact with one another.

The method may include and/or involve the devices wirelessly exchanging pairing information only during a time when the devices are in physical contact.

The method may include and/or involve ascertaining a manner in which contact between the two devices is accomplished. Ascertaining a manner in which contact between the two devices is accomplished may include and/or involve ascertaining relative motion between the devices. Ascertaining relative motion between the devices may include and/or involve ascertaining at least one of rotation, angle of approach, or relative lateral motion between the devices.

The method may include and/or involve ascertaining relative motion between the devices at one or more points of contact. Ascertaining relative motion between the devices may include and/or involve ascertaining at least one of rotation, angle of approach, or relative lateral motion between the devices, and/or ascertaining at least one of rotation, angle of contact, or relative lateral motion at the one or more points of contact.

The method may include and/or involve interpreting a duration of contact as an indication of how and/or whether pairing of the devices should proceed and/or be accomplished.

The method may include and/or involve interpreting multiple instances of contact between the devices as an indication of how and/or whether pairing of the devices should proceed and/or be accomplished.

The method may include and/or involve interpreting an intensity of contact between the devices as an indication of how and/or whether pairing of the devices should proceed and/or be accomplished. Interpreting the intensity of contact between the devices as an indication of how and/or whether pairing of the devices should proceed and/or be accomplished may include and/or involve applying at least one of an average contact force, a peak contact force, or a force gradient as the indication of how and/or whether pairing of the devices should proceed and/or be accomplished.

The method may include and/or involve the devices communicating wirelessly to obtain information needed to effect pairing with one another.

The method may include and/or involve prompting for user input as a result of contact occurring between the devices. Prompting for user input as a result of contact occurring between the devices may include and/or involve prompting for authentication information for the user, and/or providing an indication that the user should provide at least one of input from a keypad, a voice input, or a biometric input.

The method may include and/or involve authorizing an extent of pairing of the devices according to at least one of identification of one or both of the devices, or identification of a user of one or both of the devices. Authorizing an extent of pairing of the devices according to at least one of identification of one or both of the devices, or identification of a user of one or both of the devices may include and/or involve authorizing access to a greater number and/or different functions of one or both devices than would be available if the devices were paired without physical contact, and/or authorizing access to functions and/or features of one or both devices to an extent that varies according to the manner and/or point of physical contact between the devices, and/or authorizing that the user may use one or both devices, and/or to what extent.

The method may include and/or involve providing one or more audible and/or visual and/or tactile indications on the progress and/or results of pairing of the devices.

A system may include and/or involve a first device, a second device, and logic to effect pairing of the first and second devices upon detection of physical contact between the devices.

The system may include and/or involve logic to detect increasing proximity between the first and second devices and to interpret physical contact between the devices, in conjunction with recently detected increasing proximity between the devices, as an indication that pairing of the devices should be effected.

The system may include and/or involve logic to enable the devices to wirelessly exchange information needed for pairing, upon the devices approaching or becoming proximate with one another, but prior to physical contact between the devices, and logic to interpret activation of the contact sensor as an indication that the information should be applied to complete the pairing process.

The system may include and/or involve logic to enable the devices to exchange pairing information with one another via one or more physical contact points.

The system may include and/or involve logic to interpret physical contact between the devices as an indication to initiate exchange between the devices of at least some of authentication, authorization, or compatibility information needed for pairing.

The system may include and/or involve logic to interrupt the pairing process if contact between the devices is broken.

The system may include and/or involve logic to enable the devices to wirelessly exchange information needed for pairing only during physical contact between the devices.

The system may include and/or involve logic to authenticate and/or authorize pairing between the devices.

The system may include and/or involve logic to establish a secure channel for communication of pairing information between the devices.

The system may include and/or involve logic to ascertain a manner in which contact between the devices is accomplished. The logic to ascertain a manner in which contact between the devices is accomplished may include and/or involve logic to ascertain relative motion between the devices. The logic to ascertain relative motion between the devices may include and/or involve logic to ascertain at least one of rotation, angle of approach, or relative lateral motion between the devices.

The system may include and/or involve logic to ascertain relative motion between the devices at one or more points of contact. The logic to ascertain relative motion between the devices may include and/or involve logic to ascertain at least one of rotation, angle of approach, or relative lateral motion between the devices, and/or logic to ascertain at least one of rotation at the point of contact, angle of contact, or relative lateral motion at the point of contact.

The system may include and/or involve logic to detect a duration of contact between the devices and to interpret the duration of contact as an indication of how and/or whether pairing of the devices should proceed.

The system may include and/or involve logic to detect multiple instances of contact between the devices and to interpret the multiple instances of contact as an indication of how and/or whether pairing of the devices should proceed.

The system may include and/or involve logic to detect an intensity of contact between the devices and to interpret the intensity of contact as an indication of how and/or whether pairing of the devices should proceed. The logic to detect an intensity of contact between the devices and to interpret the intensity of contact as an indication of how and/or whether pairing of the devices should proceed may include and/or involve logic to detect at least one of an average contact force, a peak contact force, or a force gradient.

The system may include and/or involve logic to communicate wirelessly with at least one device different than the devices to pair, to obtain information needed to effect pairing between the devices. The at least one device different than the devices to pair may include and/or involve at least one of a proximate desktop, a laptop, or a handheld computing device.

The system may include and/or involve logic to await user input as a result of contact between the devices. The logic to await user input as a result of contact between the devices may include and/or involve logic to await authentication information for the user, and/or logic to await at least one of input from a keypad, a voice input, or a biometric input.

The system may include and/or involve logic to authorize an extent of pairing of the devices. The logic to authorize an extent of pairing of the devices may include and/or involve logic to authorize paired access to a greater number and/or different functions of one or both devices than would be available if the devices were paired without physical contact, and/or logic to authorize paired access the extent of which varies according to the manner and/or point or points of physical contact between the devices, and/or logic to authorize that a person using one or both devices is authorized to do so, and/or to what extent.

The system may include and/or involve logic to provide one or more audible and/or visual and/or tactile indications on the progress and/or results of pairing of the devices. The logic to provide one or more audible and/or visual and/or tactile indications on the progress and/or results of pairing of the devices may include and/or involve logic to provide at least one pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available, or an indication that pairing is in process. The logic to provide an indication that a user should provide input to the pairing process may include and/or involve logic to provide an indication that the user should provide at least one of a password, a spoken input, a biometric input, or information from a card and/or memory device.

Other system/method/apparatus aspects are described in the text (e.g. detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to effect the operation of a device. Software, hardware, and firmware are examples of logic. Hardware logic may be embodied in circuits. In general, logic may comprise combinations of software, hardware, and/or firmware.

Figure 1:
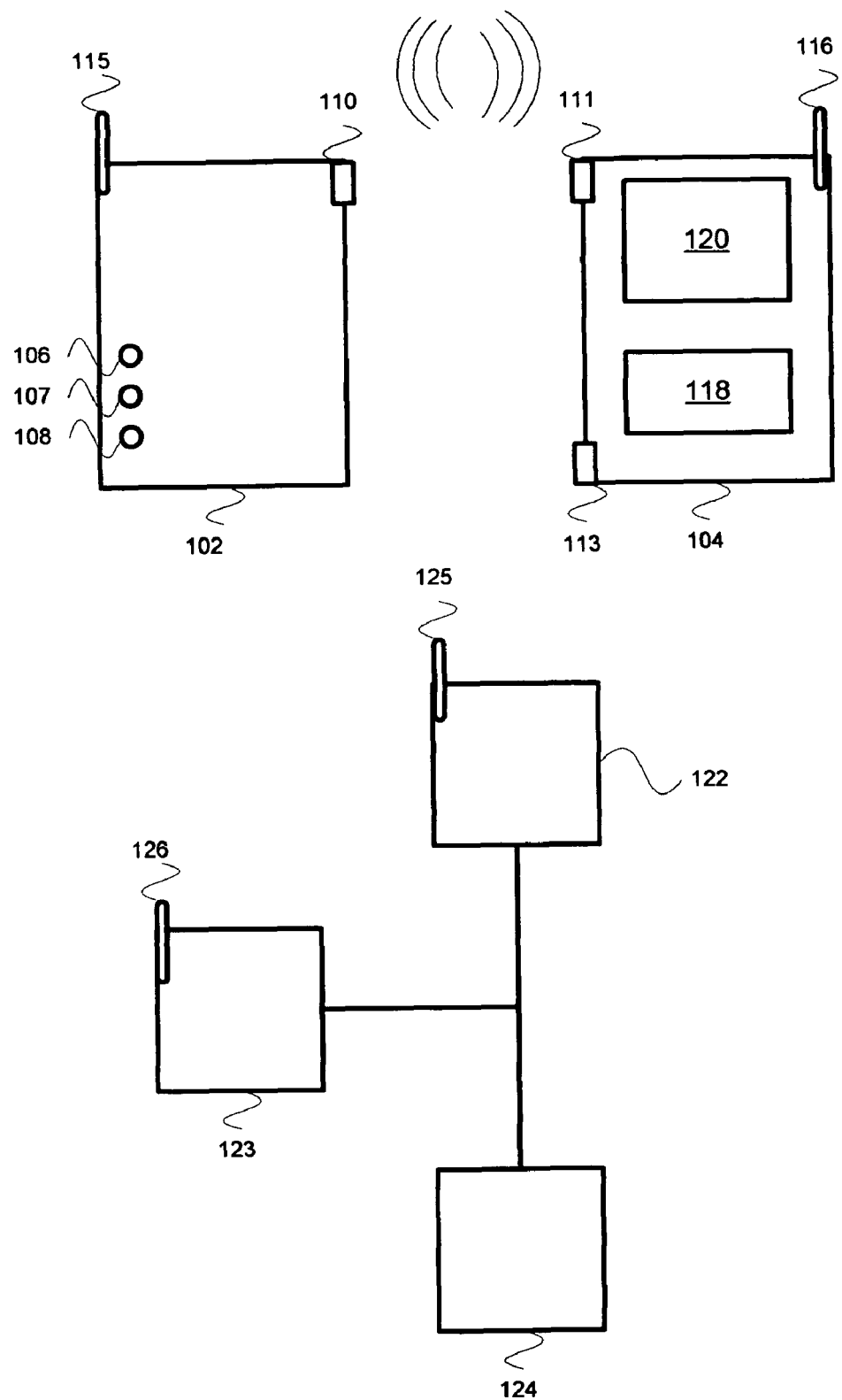
FIG. 1 is a block diagram of an embodiment of a device pairing arrangement.

FIG. 1 is a block diagram of an embodiment of a device pairing arrangement. Pairing involves information exchange between two or more devices in order to enable the devices to cooperatively interact in a trusted fashion.

Overview of FIG. 1

A device 102 includes a microphone 106, a speaker 107, a LED 108, an antenna 115 and a contact area 110. There may be more than one contact area 110. The contact area 110 may be incorporated in a complex device part such as a touch sensitive screen incorporating other functions such as display. The contact area 110 may be any part of the device 102 which is used to touch another device 104.

The microphone 106 may be used for audible input to the device 102 and may not be present in all embodiments. Audible input may include sounds such as tapping or voice input such as whistling or speaking. Voice input may be processed into words and/or phrases, and/or it may be processed as a sound pattern (e.g. a voice print). Voice input may be used, at least in part, as a biometric for individual identification.

The speaker 107 and LED 108 may be used for audible and visual information conveyed from the device 102, such as requests that an individual perform an action or feedback on the condition of some operation the device may have performed or be performing. The speaker 107 and/or LED 108 may not be present in all embodiments. Other means of communicating information such as a buzzer, display, tactile surface may be present additionally or instead of the speaker 107 and/or LED 108.

User feedback may be communicated to the user in various ways, such as those described above using speakers/LEDs/other outputs of the device, or via some other proximate device.

The device 102 may include an antenna 115 for wireless communication with other devices. The device 102 may include other features such as a scanner, a camera, or cellular telephone capabilities.

Examples of devices 102 and 104 include a medallion or wearable jewelry, headphones, a telephone and/or telephone base station, a personal digital assistant (PDA) incorporating a display, a camera, a keyboard, a scanner, a cellular telephone, and many others. Laptop and palmtop computers are also possibilities.

A second device 104 includes contact areas 111 and 113, an antenna 116, logic 118, and a display 120. The device 104 may have a single contact area, or, as shown, two or more contact areas 111, 113. The device 104 need not include a display 120, although a display may prove useful for certain aspects of the pairing process. The display 120 could be part of the first device 102, or some other device such as 122 and/or 124.

The logic 118 operates to effect various techniques and acts for pairing the first device 102 and the second device 104. The logic 118 may exist on the first device 102, the second device 104, or in part on both devices. The logic 118 may exist, at least in part, on other devices, such as devices 122, and/or 124. The devices 122 and 124 may comprise a proximate laptop, desktop, or other computing device, and/or supporting network and communication equipment.

The display 120 may be used to provide information to an individual or individuals such as the person or persons causing the contact between the two devices. In some embodiments, other means of communicating information such as an LED, buzzer, or speaker may be present additionally or instead of the display 120 on either or both of devices 102 and 104, and/or on a proximate device such as 122 or 124.

The antenna 116 enables wireless communication between the device 104 and other devices. The device 104 may include other features not described herein. The device 104 may be a laptop, desktop, tower, or server computer attached via wireless or wired communications to an Intranet and/or the Internet and providing, for example, a sophisticated application such as a medical patient monitoring station or machine control application for a machine tool.

The device 102 may be moved by a user to touch the device 104. The device 104 may also be mobile. For example, the device 104 could be a cellular telephone, PDA, or laptop computer. In some situations, either all or some part of both device 102 and device 104 may be moving at a time of contact. For example, one individual could be moving 102 while another is moving 104 and the two devices 102 104 could thus contact.

Depending on the circumstances, the device 102 or a part thereof may be moved to contact device 104, and/or the device 104 or a part thereof may be moved to contact device 102.

The device pairing arrangement may also include additional devices, such as device 122, 123, and 124. Various data, logic, resources, and capabilities, including information and logic, to accomplish the pairing process may be provided by these other devices 122, 123, and 124. The devices 102 and/or 104 to pair may communicate with one or more of the devices 122-124 using wireless or other types of communication during the pairing process.

By way of example, the device 123 may provide a network access point for a wired and/or wireless network. Thus, for example, the device 123 may include an antenna 125. The antenna 125 may enable one or both of devices 102 104 to communicate via a network with other devices, such as device 124, located remotely from device 102 104. Such communication may enable devices 102 and/or 104 to receive additional information from device 124 that may assist in the pairing process. Some of the logic 118 used to effectuate pairing including even in some cases the decision to pair may be embodied in a remote device or devices 124.

Pairing

The device pairing arrangement includes a first device 102, a second device 104, and logic 118 to effect pairing of the first and second devices upon detection of physical contact between the first and second devices. Pairing involves cooperative operation of the two devices 102 104, generally involving communication between the devices 102 104. Effecting pairing may involve actions such as identifying either one or both devices 102 104 or one or more device characteristics, features, and/or functions; identifying (authenticating) the person or some characteristic of the person using the devices 102 104; authorizing the pairing and/or to what extent; and configuring one or both of the devices 102 104 with settings and information to facilitate paired operation.

Effectuating pairing involves communication of information. Information may be communicated in various ways, including using the contact points, wirelessly, or using some wired communication method, or combinations thereof.

Information to facilitate pairing may be communicated between the two devices 102 104, or almost entirely from one device to another. For example, device 102 may consist of a medallion or ring containing stored value (similar in concept to a prepaid phone card) which is used primarily to accomplish a commercial transaction. When the medallion 102 is touched to device 104, information about the stored value may be passed to device 104. Device 104 may then perform many, most, or all actions involved to establish pairing, such as identifying the commercial transaction and deciding if it may be accomplished. (The user may be interacting through a touch screen or keyboard or verbally with device 104 during this period.). Device 104 may then initiate pairing. While the two devices are paired, device 104 may pass information about the commercial transaction back to device 102.

The information exchanged, and the direction of such exchange, may vary according to the implementation. For example, the device 102 might pass information about a desired common purpose to the device 104, along with capabilities of the device 102. The device 104 may determine if it is suitable to provide the common service with device 102, and notify device 102 of this decision. The device 102 may then pass information authenticating the person using it to the device 104. And so on.

Sometimes, effectuation of pairing may at times require an individual to provide an input to one or both of the devices 102 104, or to perform an action. For example, the user of the device 102 and/or 104 may have to enter a password or provide a biometric input before pairing will be accomplished. The user may have to speak his or her name, to be validated biometrically. The individual may have to present a finger to a scanner for biometric fingerprint identification.

Effectuation of pairing may in some instances involve access to information and processing capability external to the two pairing devices 102 104. For example, if an individual provides a biometric input to device 102, it might use the antenna 115 to communicate the fingerprint information wirelessly to device 123 via the antenna 126. Device 123 might then provide the fingerprint information, via a network, to device 124 for authentication and authorization of the user's permission to pair device 104 with device 102.

The information needed to effect pairing may be passed using a variety of physical medium. Some or all of the information needed to effect pairing may be communicated through the contact point of the two devices 102 104. Some or all of the information needed to effect pairing may be communicated using a wireless capability of either or both devices 102 104. Either or both of devices 102 104 may implement wired or wireless network connectivity, so that some or all of the information needed to effect pairing may be communicated to one or both devices via a communication network.

One or both devices 102 104 may be paired with some other device (not shown) at the time the devices 102 104 become proximate and touch. Depending on the circumstances, the original pairing or pairings may be terminated, and a pairing between the devices 102 104 effected. Or, a second pairing may occur between devices 102 104 and one or more original pairings may continue. In some circumstances, when the two devices 102 104 touch, pairing may be rejected if one or both devices 102 104 are already paired.

One or both of the devices 102 104 may discontinue pairing under certain circumstances. Pairing may be discontinued when the devices 102 104 are no longer proximate with one another, and/or if an amount of authorized pairing time lapses (e.g. the user of devices is allowed only a certain amount of time to use them together). Pairing may be discontinued due to contact being broken between the devices 102 104, and/or logic due to a user selection to discontinue pairing (e.g. the user presses a button to break the pairing connection).

Pairing may also be discontinued after completion of one or more tasks. For example, pairing may be discontinued when the paired devices 102 104 accomplish a task for which they were paired, such as placing a call, transferring a file, sending a message, or performing a backup.

One or both devices 102 104 may retain information about the pairing of the devices 102 104. The retained information may be applied to resume pairing of the devices 102 104, after pairing of the devices 102 104 is discontinued and-or interrupted. For devices that have lost proximity, pairing may be resumed once the devices 102 104 are once again in proximity, and/or once the device and the other device are once again in contact with one another. The retained information may be applied to resume pairing of the devices 102 104 once the devices 102 104 are once again in communication with the other device, e.g. upon reestablishment of a pairing connection that was discontinued or interrupted for some reason.

Contact Between Devices

The logic 118 may operate to interpret device contact, e.g. activation of the contact sensors of one or both devices 102 104, as an indication to initiate exchange between the devices 102 104 of at least some of authentication, authorization, compatibility and/or configuration information needed for pairing. Under these circumstances, this information may be passed during or after contact has occurred. Again, although the logic 118 is illustrated with respect to device 104, the logic may in fact exist wholly or in part in various elements of the system, including devices 102, 122, and 124, or any other device of the system.

The logic 118 may operate to interpret recognition of contact as a confirmation that pairing is to occur. When the devices 102 104 have a mechanism for communicating information when they are not in contact, some of the information needed to effect pairing may be communicated prior to the time of contact. For example, the devices 102 104 may both have antennas 115 116 supporting wireless communication and may pass some pairing information when in proximity but before making contact.

As previously noted, the logic 118 may include logic to enable the devices 102 104 to exchange pairing information, at least in part, with one another via the physical contact point. The logic 118 may provide for interrupting the pairing process if contact is broken. The logic 118 may provide for enabling the devices to wirelessly exchange information needed for pairing only during activation of the contact sensor.

Manner of Contact

The logic 118 to effect pairing may include logic to ascertain a manner in which contact between the two devices is accomplished. By identifying a manner of contact, other information is provided by the contact beyond the fact of contact. This additional information may be used during pairing effectuation. For example, the additional information may act to authenticate (identify) and/or authorize a user of the device(s) 102 104. For example, touching and, at the same time, rotating the device 102 clockwise could indicate that pairing should occur between a headset and a telephone base, with connection to the office. Counterclockwise rotation could mean pairing between the headset and the base, with a connection to a relative's home.

The manner of touching may be used for other purposes. For example, in the previous example of touching and rotating, a particular pattern of movements and/or rotations could be used to authorize the pairing.

The logic 118 may determine which contact area (such as 111 or 113) or areas are being touched. The logic 1118 may determine the orientation of one device 102 with respect to the other 104 at the time of contact. For example, logic may determine that the long axis of one device 102 is oriented horizontally with respect to the long axis of the second device 104. Determining the orientation of one device 102 with respect to another 104 may be performed by determining the orientation of one contact area (such as the long axis of contact area 110) on device 102 with respect to a contact area 111 on device 104.

The logic 118 may operate to ascertain relative motion between the devices 102 104. Ascertaining relative motion may include may include ascertaining at least one of rotation, angle of approach, or relative lateral motion between the devices 102 104. Determining relative lateral motion may include logic to recognize that the device 102 which has touched the device 104 is moving across one or more of the contact points 110 111 113, and if so, how fast and in what relative direction.

The logic 118 may operate to detect a duration of contact and to interpret the duration of contact as an indication of how and/or whether pairing of the devices should proceed. The logic 118 may operate to detect multiple instances of contact and to interpret the multiple instances of contact as an indication of how and/or whether pairing of the devices should proceed. The logic 118 may operate to detect an intensity of contact and to interpret the intensity of contact as an indication of how and/or whether pairing of the devices should proceed, for example to detect at least one of an average contact force, a peak contact force, or force gradient.

Relative Motion Before or after Contact

The logic 118 may operate to ascertain relative motion between the devices 102 104 prior to or after contact. Information about relative motion may be applied for various purposes, including authentication and/or authorization. For example, the user may be required to swing the device 102 to and fro when proximate to the device 104 within a certain number of seconds of touching in order for the pairing to be authorized. Ascertaining relative motion prior to or after contact may include use of the wireless capabilities of the devices 102 104.

Authentication/Authorization

The logic 118 to effect pairing may include logic to authenticate and/or authorize pairing between the devices 102 104. Authenticating and/or authorizing the pairing may include identifying one or both devices 102 104 and/or identifying at least one device characteristic for one or both devices 102 104, such as determining whether the devices 102 104 are suitable for use for the purpose required and that they 102 104 are compatible for pairing to accomplish that purpose. For example, pairing may have been initiated with a goal of accomplishing a commercial transaction requiring secure communication. Both devices 102 104 may have a device characteristic of supporting one or more varieties of encryption. However, they 102 104 may support only DES encryption in common. The recognition that the devices 102 104 are compatible and that DES encryption should be employed may occur as a result of the information exchanged during the pairing effectuation process.

Authenticating and/or authorizing pairing may include identifying a user of one or both of the devices) 102 104 touching and/or to identify at least one characteristic of the user. For example, the user may be a member of a group, department, or organization, such as a computer network administrator with broad access privileges.

The system may include logic to authorize an extent of pairing of the devices 102 104. By extent of pairing it is meant authorization of which functions and how extensively certain functions can be performed while the devices are paired. Authorization of an extent of pairing may be based, at least in part, on the identity or at least one characteristic of the user. Authorization of an extent of pairing may be based, at least in part, on the identity of the devices 102 104 or device characteristics or state.

Other factors may be taken into consideration when authorizing an extent of pairing to allow. Authorization of an extent of pairing may be based, at least in part, on time of day or physical location. Authorization of an extent of pairing may be based, at least in part, on the manner of touching and/or point of physical contact 110 111 113 between the two devices 102 104. Authorization may be provided for a greater number and/or different functions and/or features of one or both devices 102 104 than would be available if the devices were paired without physical contact. A secure channel may be established between the devices for communication of pairing information, particularly authentication/authorization information.

Feedback

The logic 118 may operate to provide one or more audible and/or visual and/or tactile indications on the progress and/or results of pairing of the devices. The device 102 may include feedback capabilities such as a speaker 107 and/or LED 108. The device 104 is shown as including a display 120 for feedback purposes, among other things.

Providing feedback may include providing at least one pairing options, such as might be presented on a display 120 or by the speaker 107. Examples of pairing options are a reason for pairing and/or task to be performed, options or attributes to affect the extent of pairing and/or pairing configuration, and so on.

Providing feedback may include providing an indication that a user should provide input to the pairing process. Such inputs could include speech, keyboard entry, pressing a switch, performing a scan, or taking an action or actions involving the contact points 110 111 113 of the devices 102 104. Providing feedback may include providing one or more lights, tones, vibrations, sounds, or display indications.

The feedback may include at least one indication that pairing was successful, unsuccessful due to insufficient available information, to indicate that pairing between the devices is available, or to indicate that pairing is in process. The feedback may indicate that the user should provide at least one of a password, spoken input, biometric input, or information from a card and/or memory device.

Interaction with Other Devices

The logic 118 may operate to communicate wirelessly with at least one device 122 124 different than the two devices 102 104 to obtain information needed to effect pairing between the devices 102 104. The other device or devices 122 124 may be physically near (same or close room or same building) or remotely located with respect to the location of the pairing devices 102 104. The other device or devices 122 124 may be accessed wirelessly, or via a network such as an intranet or the Internet.

User Input

The logic 118 to effect pairing may operate to await user input as a result of activation of one or more of the contact sensors 110 111 113. The system may await user input in the form of authentication information for the user, for example from a keypad, voice input, or biometric input. The system may await actions to be taken by the user, such as touching the devices 102 104 together again, touching for a certain approximate duration of time, touching multiple times in a pattern, rotating one device 102 with respect to the other 104 at the contact point 110 111 113, touching the devices 102 104 again but using at least one different contact point (such as 113 instead of 111), or other actions.

Proximity

The logic 118 may operate to detect increasing proximity between the devices 102 104 and to interpret activation of the contact sensor 110 111 113, in conjunction with recently detected increasing proximity between the devices, as an indication that pairing of the devices should be effected. For example, the wirelessly exchange of information needed for pairing may take place upon the devices approaching or becoming proximate with one another, but prior to activation of the contact sensor, and activation of the contact sensor may provide an indication that the information should be applied to complete the pairing process.

Figure 2:
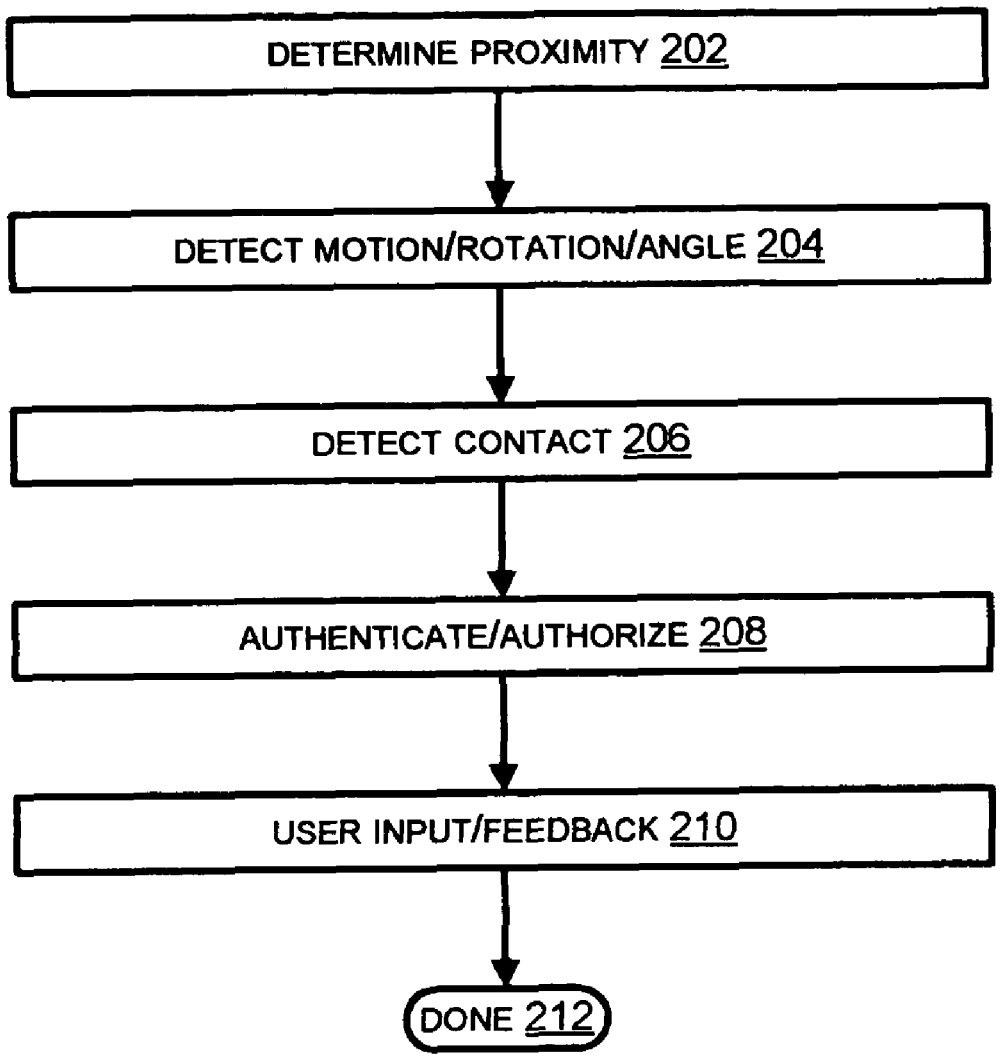
FIG. 2 is a flow chart of an embodiment of a device pairing method.

FIG. 2 is a flow chart of an embodiment of a device pairing method.

Overview of FIG. 2

At 202, the devices are recognized as proximate. This action may take place, for example, in situations where the devices communicate prior to device contact. At 204, the motion of the devices is analyzed. As previously noted, such analysis may take place prior to, during, or after contact. At 206, one or both devices detect that contact has occurred between them. At 208, information obtained prior to, during, or after contact is applied to authenticate and/or authorize the pairing of the devices. At 210, feedback is provided to the user and user input obtained. Feedback and user input may occur as a part of the authentication and authorization process 208, or for other reasons. At 212, the pairing effectuation process is complete.

Detecting Proximity

Activation of one or more contact sensors, in conjunction with recently detected increasing proximity between the devices, may provide an indication that pairing of the devices should be attempted. Information for pairing the devices may be exchanged wirelessly, upon the devices becoming proximate with one another, but prior to activation of one or more contact sensors, and activation of the one or more contact sensors may provide an indication to complete pairing of the devices.

Relative Motion Before or after Contact

As previously discussed, relative motion between the devices may be applied to influence the pairing process, and/or the extent of pairing undertaken.

Contact Detection and Processing

Pairing between the devices may be effected upon detection of physical contact between the devices. Pairing information may be exchanged, in some circumstances, via the physical contact point(s). Contact may result in initiating an exchange between the devices of at least some of authentication, authorization, or compatibility information needed for pairing. The pairing process may be interrupted if the devices lose contact with one another. The devices may exchange pairing information prior to, during, only during, or after a time when the devices are in physical contact.

Manner of Contact

The manner in which contact between the two devices is accomplished may be applied to influence the pairing process, as previously described.

Authentication/Authorization

The pairing process, and the extent of pairing effected, may involve authentication and/or authorization of a user of the device or devices, and/or the devices themselves, as previously discussed. For example, identification of one or both of the devices, or identification of a user of one or both of the devices, and/or characteristics thereof, may be involved in the pairing process.

The extent to which the devices are paired may be influenced by various factors, as previously discussed. Pairing may result in access to a greater number and/or different functions of one or both devices than would be available if the devices were paired without physical contact. Pairing may result in access to functions and/or features of one or both devices the extent of which varies according to the manner and/or point of physical contact between the devices.

Feedback

Feedback may be provided during the pairing process, as previously discussed.

User Input

User input to the pairing process may be provided, as previously discussed.

Figure 3:
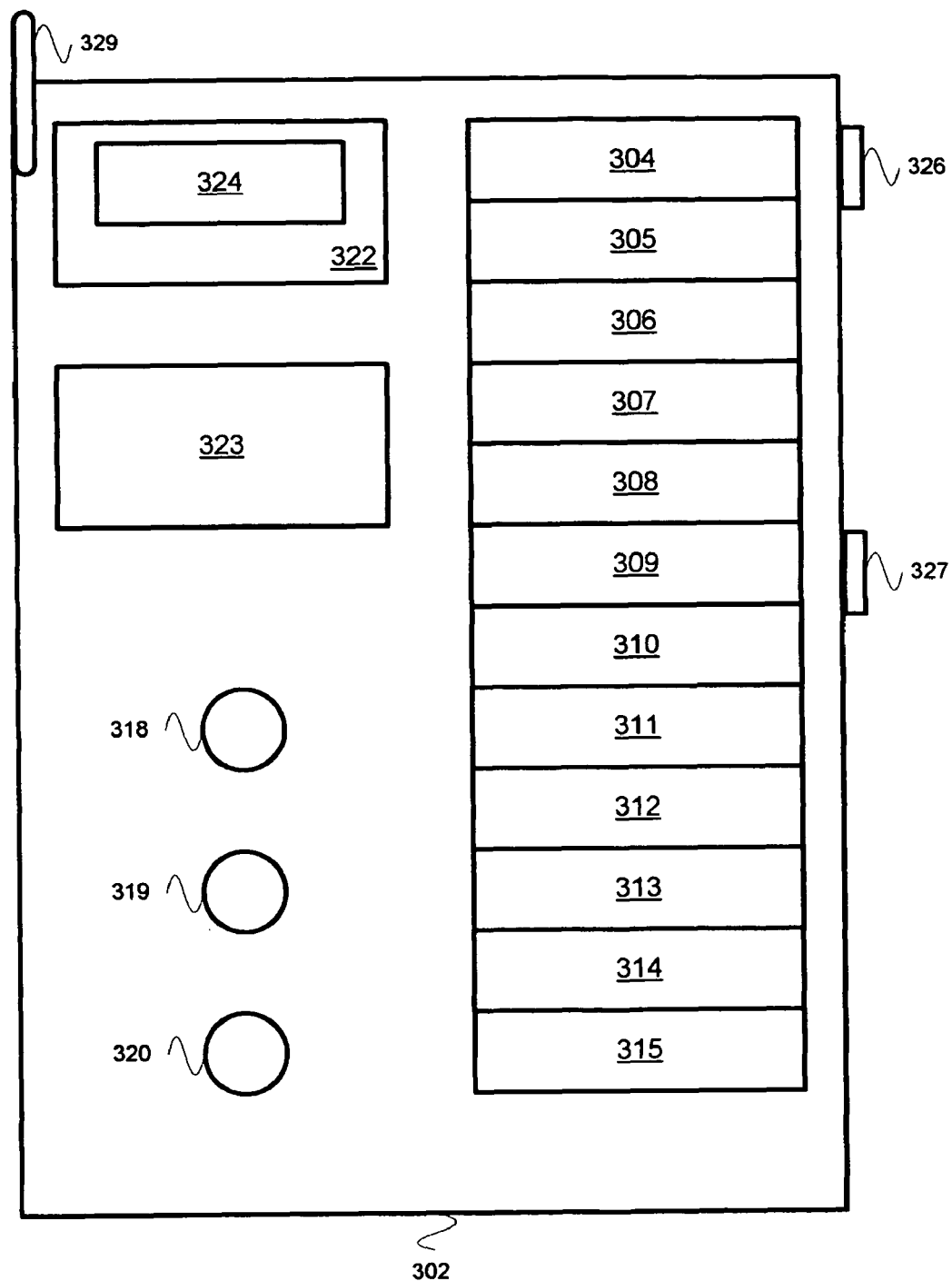
FIG. 3 is a block diagram of an embodiment of a device to accommodate pairing.

FIG. 3 is a block diagram of an embodiment of a device to accommodate pairing.

Overview of FIG. 3

A device 302 includes a display 322 that may be used, among other things, to provide a menu 324 of options. The device includes a microphone 318 which may be used to detect sound (such as tapping) and/or voice input. The device includes a keypad 323. The device includes two parts which may be used to provide user feedback, a speaker 319 and a LED 320. The device includes two contact sensors 326 and 327. The device also includes various logic elements which may operate to effect device pairing. Of course, the device may include additional elements that are not shown here and which are superfluous to this discussion.

Logic of the device includes pairing process management logic 304, contact processing logic 305, wireless communication logic 306, proximity and motion logic 307, user input logic 308, speech processing logic 309, biometric processing logic 310, logic 311 to interact with a device or devices other that the two pairing devices, authentication logic 312, logic 315 to discontinue pairing, retain pairing information, and/or reestablish/resume pairing under certain circumstances, and authorization logic 313.

An antenna 329 enables the device to engage in wireless communication.

Not all embodiments of the device 302 will include all of the illustrated logic. For example, if a device 302 did not have a speaker 319 or microphone 318 and performed no audible inputs or outputs, it would not need and probably would not have speech processing logic 309. If a device had no biometric input it would not need and probably would not have biometric processing logic 310. And so on.

Device Contact

The device 302 may include at least one contact sensor 326 327, and logic to effect pairing 304 with another device upon activation of the contact sensor 326 327.

The device 302 may include logic 305 to enable the device 302 to exchange with the other device information needed for pairing via the physical contact points 326 327. The device 302 may include logic to interrupt the pairing process if contact is broken. The device 302 may include logic to enable the device to wirelessly exchange with another device information needed for pairing only during activation of the contact sensor. The device 302 may include logic to detect temperature at the contact point or points, and/or conductivity at the contact point or points, as an indication of how and/or whether pairing of the device and the other device should proceed.

Communication with Other Devices

The device 302 may include logic 311 to communicate wirelessly with at least one device different than its pairing partner device to obtain information needed to effect pairing. Such a third device may include a network access point, or a proximate laptop, desktop, or handheld computing device, among other things.

The device 302 may include logic 305 to enable the device 302 to communicate information needed for pairing via the physical contact points 326 327. The device 302 may include logic 306 to enable wireless communication of information needed for pairing.

Device User Input

The device 302 may include logic 308 to await user input as a result of activation of the contact sensor(s) 326 327, such as authentication information for the user from a keypad, voice input, the display 120, or biometric input.

Device Authorization/Authentication

The device 302 may include logic to interpret activation of the contact sensors 326 327 as an indication to initiate exchange with the other device of at least some of authentication, authorization, or compatibility information needed for pairing. The device 302 may include logic 312 313 to authenticate and/or authorize pairing with the other device. The device 302 may include logic to switch from one pairing partner to another as a result of activation of the contact sensors 326 327. The device 302 may include logic to establish a secure channel for communication of pairing information.

The device 302 may include logic to authorize an extent of pairing of the device and the other device, such as paired access to a greater number and/or different functions and/or features of one or both devices than would be available if the devices were paired without physical contact.

The device 302 may include logic to authorize paired access the extent of which varies according to the manner and/or point of physical contact between the devices. The device 302 may include logic to authorize that a person using one or both devices is authorized to do so, and/or to what extent.

Device Feedback

The device 302 may include feedback logic (e.g. speaker 319, LED 320 and operation logic 314 there for) to provide one or more audible and/or visual and/or tactile indications on the progress and/or results of pairing of the device and the other device, such as lights, tones, vibrations, sounds, or display indications. The device 302 may include at least one menu 324 of pairing options. The device 302 may include logic to provide an indication that a user should provide input to the pairing process.

The device 302 may include at least one of logic to provide an indication that pairing was successful, unsuccessful due to insufficient available information, to indicate that pairing between the devices is available, or to indicate that pairing is in process.

The device 302 may include logic to provide an indication that the user should provide at least one of a password, spoken input, biometric input, or information from a card and/or memory device.

Device Manner of Contact

The device 302 may include contact processing logic 305 to ascertain a manner in which contact between devices is accomplished, such as rotation, angle of incidence, or relative lateral motion between the device 302 and the other device, either before and/or after contact, and/or during contact at the contact point or points. The device 302 may include logic to detect a duration of contact and to interpret the duration of contact as an indication of how and/or whether pairing of the device 302 and the other device should proceed.

The device 302 may include logic to detect multiple instances of contact and to interpret the multiple instances of contact as an indication of how and/or whether pairing of the device 302 and the other device should proceed. The device 302 may include logic to detect an intensity of contact and to interpret the intensity of contact as an indication of how and/or whether pairing of the device 302 and the other device should proceed, such as logic to detect at least one of an average contact force, a peak contact force, or force gradient.

Device Proximity

The device 302 may include logic 307 to detect proximity, and/or increasing proximity with another device and to interpret activation of the contact sensor, in conjunction with proximity and/or recently detected increasing proximity with the other device, as an indication that pairing with the other device should be attempted.

The device 302 may include logic 306 to enable the device to wirelessly exchange with the other device information needed for pairing, upon approaching or becoming proximate with the other device, but prior to activation of the contact sensor 326 327, and logic to interpret activation of the contact sensor 326 327 as an indication that the information should be applied to complete the pairing process.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A device comprising:
   at least one contact sensor;
   logic to enable the device to wirelessly exchange with at least one other device and prior to physical contact with the at least one other device information needed for pairing;
   logic to determine one or more indications of contact of the at least one other device with the at least one contact sensor;
   logic to determine one or more pairing parameters in response to one or more relative contact motions including at least one of rotation, angle, and/or movement associated with contact of the at least one other device with the at least one contact sensor;
   logic to, in response to at least one of the one or more indications of contact, prompt for at least one of voice input, biometric input, and/or key input; and
   logic to, in response to receiving the at least one of voice input, biometric input, and/or key input, apply the wirelessly exchanged information and the one or more pairing parameters to effect pairing with the at least one other device.

2. The device of claim 1, further comprising:
   logic to detect increasing proximity of the at least one other device.

3. The device of claim 1, wherein the logic to determine one or more pairing parameters in response to one or more relative contact motions including at least one of rotation, angle, and/or movement associated with contact of the at least one other device with the at least one contact sensor comprises:
   logic to determine one or more pairing parameters in response to one or more relative contact motions including multiple instances of contact.

4. The device of claim 1, wherein the logic to determine one or more pairing parameters in response to one or more relative contact motions including at least one of rotation, angle, and/or movement associated with contact of the at least one other device with the at least one contact sensor comprises:
   logic to determine one or more pairing parameters in response to one or more relative contact motions including one or more intensities of contact.

5. The device of claim 1, wherein the logic to, in response to receiving the at least one of voice input, biometric input, and/or key input, apply the wirelessly exchanged information and the one or more pairing parameters to effect pairing with the at least one other device comprises:
   logic to, in response to receiving the at least one of voice input, biometric input, and/or key input, apply the wirelessly exchanged information and the one or more pairing parameters to effect pairing with the at least one other device with at least one function greater than and/or different from that which would be available without contact.

6. The device of claim 1, wherein the logic to, in response to receiving the at least one of voice input, biometric input, and/or key input, apply the wirelessly exchanged information and the one or more pairing parameters to effect pairing with the at least one other device comprises:
   logic to, in response to receiving the at least one of voice input, biometric input, and/or key input, apply the wirelessly exchanged information and the one or more pairing parameters to effect pairing with the at least one other device the extent of which varies according to the one or more relative contact motions.

7. A method comprising:
   wirelessly exchanging with at least one other device and prior to physical contact with the at least one other device information needed for pairing between the devices;
   determining one or more indications of contact of the at least one other device with the at least one contact sensor;

determining one or more pairing parameters in response to one or more relative contact motions including at least one of rotation, angle, and/or movement associated with contact of the at least one other device with the at least one contact sensor;

in response to at least one of the one or more indications of contact, prompting for at least one voice input, biometric input, and/or key input; and in response to receiving the at least one of voice input, biometric input, and/or key input, applying the wirelessly exchanged information and the one or more pairing parameters to effect pairing with the at least one other device.

8. The method of claim 7, further comprising:
detecting increasing proximity of the at least one other device.

9. The method of claim 7, wherein the wirelessly exchanging with at least one other device and prior to physical contact with the at least one other device information needed for pairing comprises:

wirelessly exchanging with at least one other device and prior to physical contact with the at least one other device information needed for pairing including at least one of authentication, authorization, and/or compatibility information needed for pairing.

10. The method of claim 7, wherein the in response to receiving the at least one of voice input, biometric input, and/or key input, applying the wirelessly exchanged information and the one or more pairing parameters to effect pairing with the at least one other device comprises:

in response to receiving the at least one of voice input, biometric input, and/or key input, applying the wirelessly exchanged information and the one or more pairing parameters to effect pairing with the at least one other device the extent of which varies according to at least one of user identification and device identification.

11. The method of claim 7, wherein the in response to receiving the at least one of voice input, biometric input, and/or key input, applying the wirelessly exchanged information and the one or more pairing parameters to effect pairing with the at least one other device comprises:

in response to receiving the at least one of voice input, biometric input, and/or key input, applying the wirelessly exchanged information and the one or more pairing parameters to effect pairing with the at least one other device the extent of which varies according to the one or more relative contact motions.

12. A system comprising:
at least one first device;
at least one second device;
logic to enable the at least one first device and the at least one second device to wirelessly exchange information needed for pairing prior to physical contact between the devices;
logic to determine one or more indications of contact between the devices;
logic to determine one or more pairing parameters in response to one or more relative contact motions including at least one of rotation, angle, and/or movement associated with contact between the devices;
logic to, in response to at least one of the one or more indications of contact, prompt for at least one voice input, biometric input, and/or key input; and
logic to, in response to receiving the at least one of voice input, biometric input, and/or key input, apply the wirelessly exchanged information and the one or more pairing parameters to effect pairing of the devices.

13. The system of claim 12, further comprising:
logic to interrupt pairing if contact between the devices is broken.

14. The system of claim 12, wherein the logic to determine one or more pairing parameters in response to one or more relative contact motions including at least one of rotation, angle, and/or movement associated with contact between the devices comprises:

logic to determine one or more pairing parameters in response to one or more relative contact motions including at least one of rotation, angle, and/or movement occurring at and/or during contact between the devices.

* * * * *

UNITED STATES PATENT AND TRADEMARK OFFICE
CERTIFICATE OF CORRECTION

| | | |
|---|---|---|
| PATENT NO. | : 7,925,022 B2 | Page 1 of 1 |
| APPLICATION NO. | : 11/136099 | |
| DATED | : April 12, 2011 | |
| INVENTOR(S) | : Jung et al. | |

It is certified that error appears in the above-identified patent and that said Letters Patent is hereby corrected as shown below:

At Column 18, Lines 63-64, Claim 7 please replace "...device information needed for pairing between the devices;" with --device information needed for pairing--

Signed and Sealed this
Eighteenth Day of December, 2012

David J. Kappos
*Director of the United States Patent and Trademark Office*